United States Patent
Yoon

(10) Patent No.: US 7,940,690 B2
(45) Date of Patent: May 10, 2011

(54) APPARATUS AND METHOD FOR DETERMINING TRANSMISSION MODE IN WIRELESS COMMUNICATION SYSTEM

(75) Inventor: Eun-Chul Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 853 days.

(21) Appl. No.: 11/983,149

(22) Filed: Nov. 7, 2007

(65) Prior Publication Data

US 2008/0107085 A1    May 8, 2008

(30) Foreign Application Priority Data

Nov. 7, 2006 (KR) .......................... 10-2006-0109696

(51) Int. Cl.
*H04J 1/16* (2006.01)
*H04B 7/216* (2006.01)
(52) U.S. Cl. .......................... 370/252; 370/278; 370/329
(58) Field of Classification Search .................. 370/252, 370/329, 278
See application file for complete search history.

(56) References Cited

U.S. PATENT DOCUMENTS
2007/0011589 A1* 1/2007 Palanki .......................... 714/780

FOREIGN PATENT DOCUMENTS
| EP | 1 227 539 A1 | 7/2002 |
| KR | 1020030032688 A | 4/2003 |
| KR | 1020080025879 A | 3/2008 |
| WO | WO 2006/055241 A2 | 5/2006 |

* cited by examiner

*Primary Examiner* — John Pezzlo

(57) ABSTRACT

Provided is an apparatus and method for determining a transmission mode for a base station in a wireless mobile communication system. The method includes measuring a state of a channel with a mobile station, determining whether channel states between the mobile station and a predetermined number of other mobile stations are orthogonal to each another, determining a space division multiple access (SDMA) mode as the transmission mode for the base station if the channel states are orthogonal to each other, and determining a beam-forming (BF) mode as the transmission mode for the base station if the channel states are not orthogonal to each other.

14 Claims, 5 Drawing Sheets

APPARATUS AND METHOD FOR DETERMINING TRANSMISSION MODE IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 7, 2006 and assigned Serial No. 2006-109696, the entire disclosure of which is hereby incorporated by reference.

TECHNICAL FIELD OF THE INVENTION

The present invention relates to a wireless mobile communication system, and in particular, to an apparatus and method for determining a transmission mode in a wireless mobile communication system.

BACKGROUND OF THE INVENTION

Communication using multiple antennas is efficient to perform high-speed data transmission and to increase the capacity of a communication system. Signal transmission schemes using the multiple antennas may be classified into a beamforming (BF) scheme and a space division multiple access (SDMA) scheme.

In the BF scheme, communication with a mobile station can be performed using a single frequency resource unit, multiple antennas, and an interference cancellation scheme. In the SDMA scheme, simultaneous communication with a plurality of mobile stations can be performed using a single frequency resource unit and multiple antennas at the same point of time.

FIG. 1 illustrates a conventional base station management scheme.

Referring to FIG. 1, conventionally, only one of a beamforming (BF) mode and a space division multiple access (SDMA) mode has to be used as a transmission mode in a cell. The cell can be divided into at least one sector.

When the SDMA mode is used in a cell, a scheduler can select two mobile stations to which a single frequency resource is to be allocated. Although the scheduler may also select three or more mobile stations, it is assumed to select two mobile stations for convenience of explanation. When selecting the two mobile stations, the scheduler has to consider channel orthogonality between the mobile stations.

If the scheduler determines that channels between the two mobile stations are not orthogonal or are nearly non-orthogonal, it is desirable for the scheduler to apply the BF mode to a cell or a sector. A system is assumed in which a cell having three sectors and a base station exists logically or physically in each of the sectors. In this case, the base stations are a short distance away from one another and thus can directly communicate with one another. When the BF mode is applied to the system, a definition has been given for a scheme in which all of the three sectors operate in the BF mode. However, any definition has not been given for a scheme in which the BF mode and the SDMA mode are used together.

SUMMARY OF THE INVENTION

To address the above-discussed deficiencies of the prior art, it is a primary aspect of the present invention to address at least the above problems and/or disadvantages and to provide at least the advantages described below. Accordingly, an aspect of the present invention is to provide a method and apparatus capable of using a beamforming (BF) mode and a space division multiple access (SDMA) mode together in a wireless mobile communication system.

According to one aspect of the present invention, there is provided a method for determining a transmission mode for a base station in a wireless mobile communication system. The method includes measuring a state of a channel with a mobile station, determining whether channel states between the mobile station and a predetermined number of other mobile stations are orthogonal to each another, determining a space division multiple access (SDMA) mode as the transmission mode for the base station if the channel states are orthogonal to each other, and determining a beamforming (BF) mode as the transmission mode for the base station if the channel states are not orthogonal to each other.

According to another aspect of the present invention, there is provided an apparatus for determining a transmission mode for a base station in a wireless mobile communication system. The apparatus includes a metric calculator for receiving channel state information of a preset number of mobile stations and performing metric calculation to determine whether channel states of the mobile stations are orthogonal to each other, a threshold comparator for receiving a metric function value from the metric calculator and comparing the metric function value with a preset threshold, and a controller for selecting a space division multiple access (SDMA) mode if the metric function value is less than the threshold and selecting a beamforming (BF) mode if the metric function value is greater than the threshold.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present invention suggests a method and apparatus capable of using a beamforming (BF) mode and a space division multiple access (SDMA) mode together in a cell divided into at least two sectors in a wireless mobile communication system. The present invention can also be applied to each cell in a wireless mobile communication system having a multi-cell structure.

Figure 1:
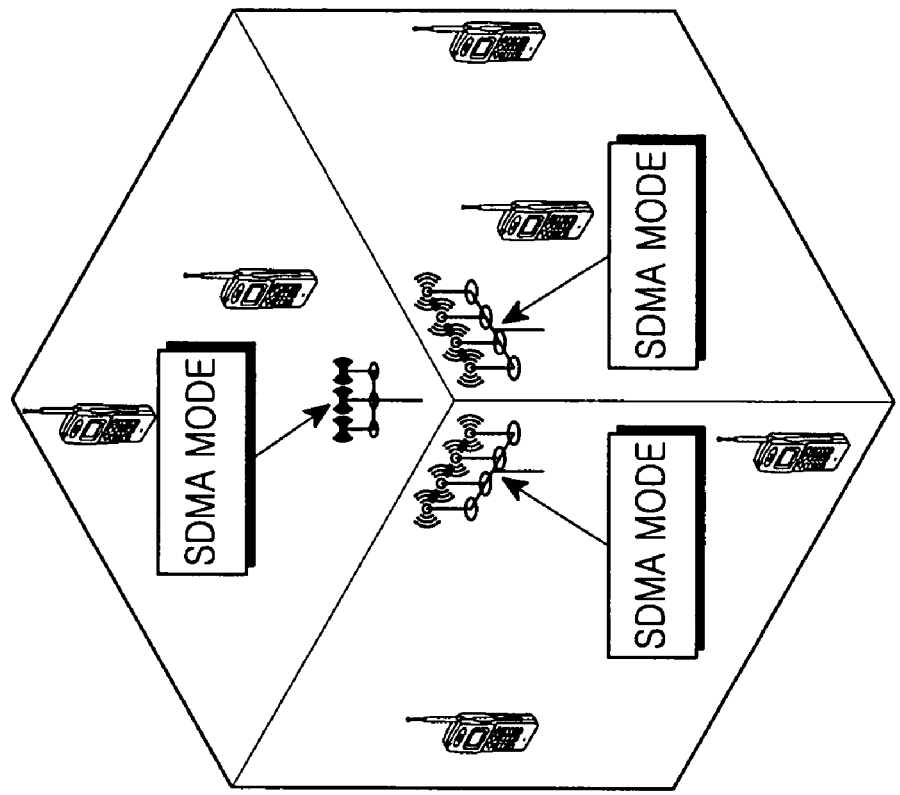
FIG. 1 illustrates a conventional base station management scheme.
Figure 1:
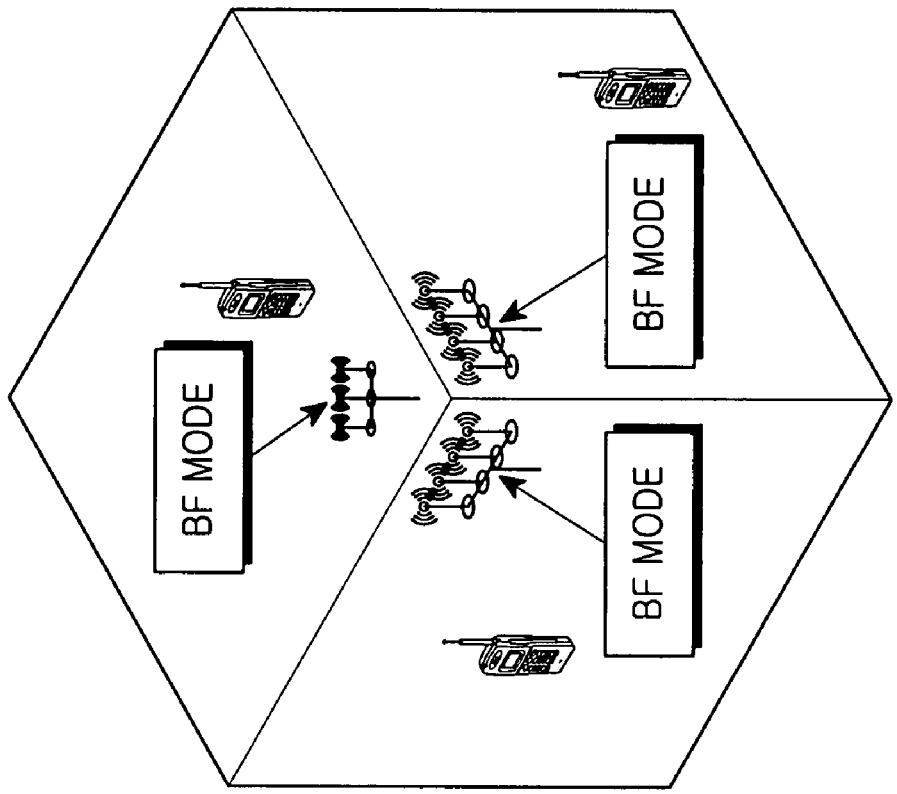
Figure 2:
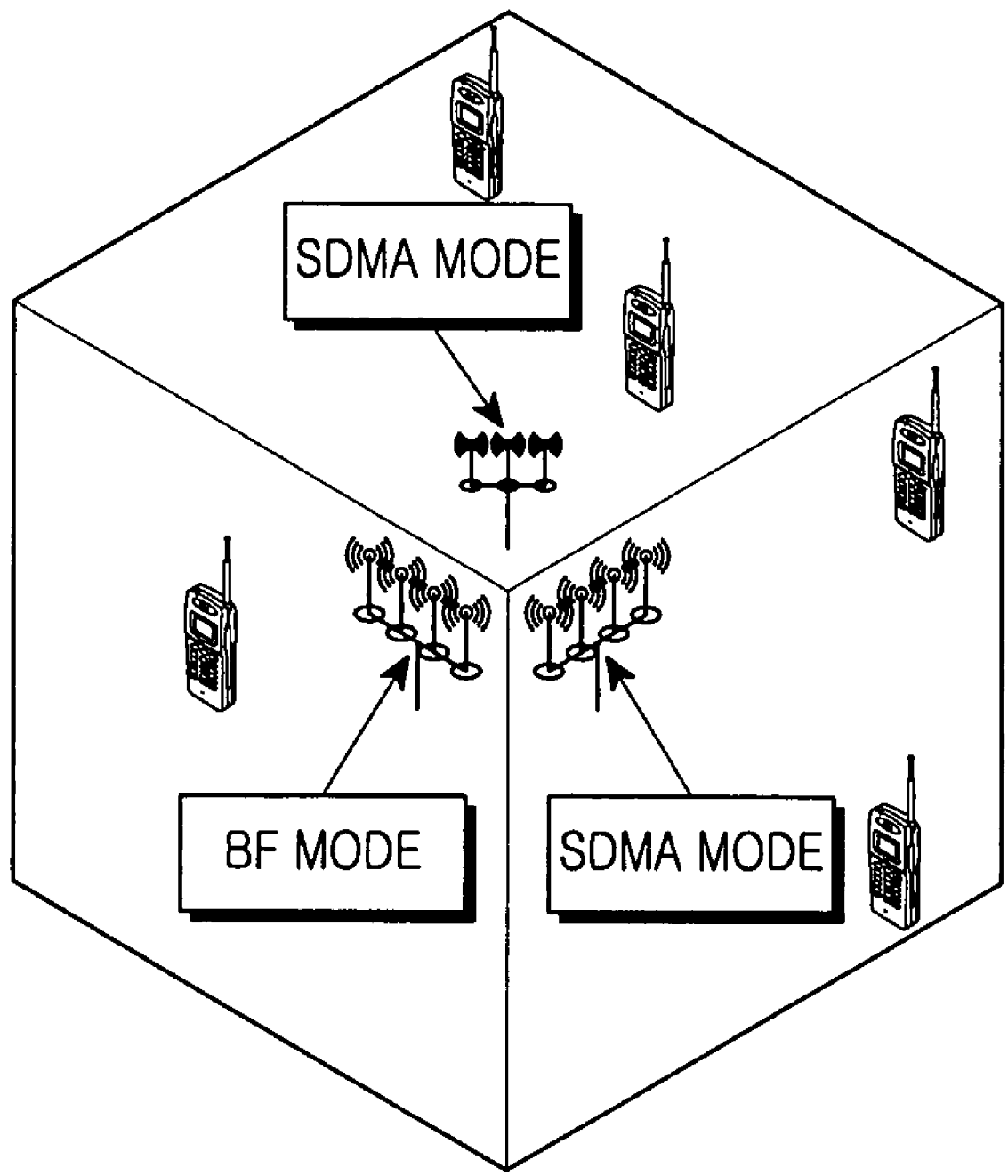
FIG. 2 illustrates a system configuration in which a Beam-Forming (BF) mode and a Space Division Multiple Access (SDMA) mode are used together according to an exemplary embodiment of the present invention.

FIG. 2 illustrates a system configuration in which the BF mode and the SDMA mode are used together according to an exemplary embodiment of the present invention.

Referring to FIG. 2, a cell is divided into three sectors, in two of which base stations transmit signals using the SDMA mode and in the remaining one of which a base station transmits a signal using the BF mode.

Figure 3:
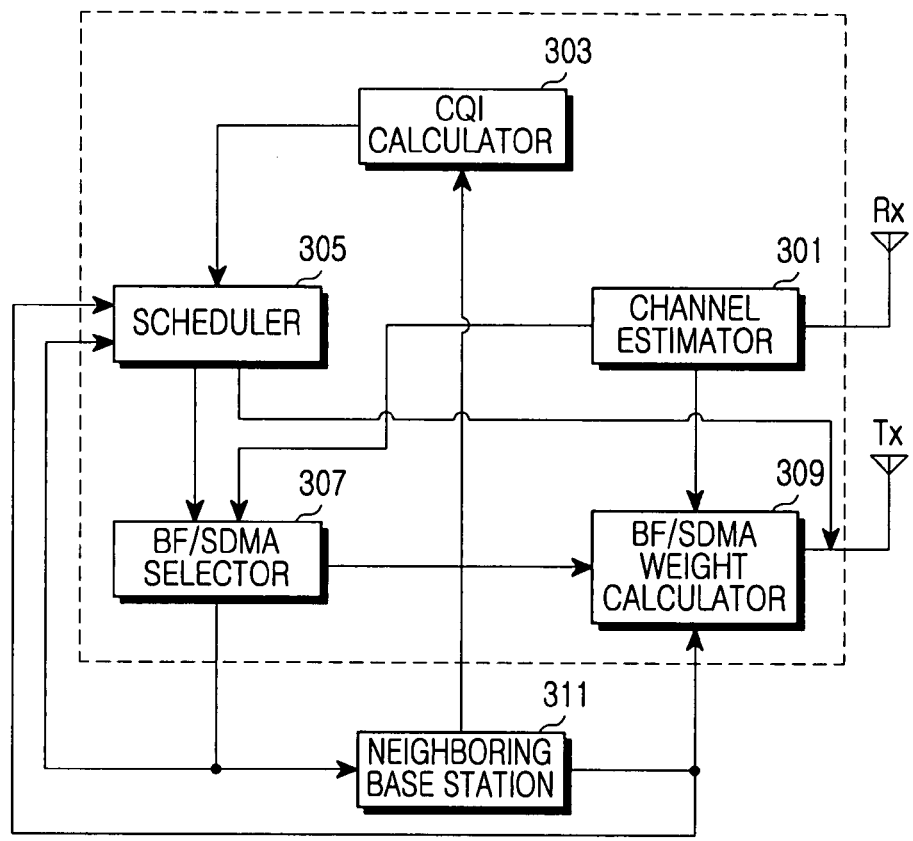
FIG. 3 is a block diagram of an apparatus for selecting a BF mode or an SDMA mode for a base station according to an exemplary embodiment of the present invention.

FIG. 3 is a block diagram of an apparatus for selecting the BF mode or the SDMA mode for a base station according to an exemplary embodiment of the present invention.

Referring to FIG. 3, a channel estimator 301 of the base station receives a sounding sequence from a mobile station and estimates an uplink (UL) channel state. The sounding sequence is an orthogonal signal transmitted from the mobile station to the base station for channel estimation. The estimated channel information is input to a BF/SDMA selector 307.

A channel quality information (CQI) calculator 303 determines CQI of the mobile station based on downlink (DL) channel state information fed back to the base station from the mobile station. The CQI may be a signal-to-interference and noise ratio (SINR). The determined CQI is input to the scheduler 305 and the scheduler 305 determines a data transmission priority based on a data transmission request from each mobile station, standby time from the reception of the data transmission request up to the current point of time, and the CQI. For priority determination, a fairness algorithm may be used. Based on the determined data transmission priority, the scheduler 305 selects two mobile stations capable of sharing a single frequency resource unit.

The BF/SDMA selector 307 determines orthogonality between a channel vector between one of the selected two mobile stations and a channel vector between the other of the selected two mobile stations and the base station. Such a determination can be made using:

$$f(h_a, h_b) = \frac{|h_b^H \cdot h_a|}{\sqrt{h_a^H \cdot h_a}\sqrt{h_b^H \cdot h_b}}. \quad \text{[Eqn. 1]}$$

In Equation 1, a and b indicate a mobile station a and a mobile station b, h indicates a channel vector, and superscript H indicates Hermitian. It can be seen from Equation 1 that channels of the mobile stations a and b become nearly orthogonal to each other as a value of Equation 1 approximates to 0, while the channels of the mobile stations a and b become non-orthogonal to each other as the value of Equation 1 approximates to 1.

The BF/SDMA selector 307 selects the SDMA mode if a metric function value determined by calculating Equation 1 is less than a preset threshold (e.g., 0.5) and selects the BF mode if the determined metric function value is greater than the preset threshold. In other words, the BF/SDMA selector 307 selects for the two mobile stations, the SDMA mode in which corresponding frequency resources are allocated to the two mobile stations if the two channel vectors are orthogonal or nearly orthogonal to each other. However, if the two channel vectors are not orthogonal to each other, the BF/SDMA selector 307 selects the BF mode for one of the two mobile stations, which has the higher priority. The priority can be determined based on a channel state or a quality of service (QoS) level of each of the two mobile stations.

The BF/SDMA sector 307 outputs information about the selected transmission mode and outputs sounding sequence information to be transmitted by each of the two mobile stations to a neighboring base station 311 and a BF/SDMA weight calculator 309. The BF/SDMA weight calculator 309 calculates a weight corresponding to the BF mode or the SDMA mode. For the BF mode, the BF/SDMA weight calculator 309 determines one BF weight value. For the SDMA mode, the BF/SDMA weight calculator 309 determines two SDMA weight values. A signal to be transmitted via a transmit antenna in the BF mode is in the form of the product of the signal and the determined BF weight value, but a signal to be transmitted via a transmit antenna in the SDMA mode is in the form of a sum of the signals multiplied by the determined two SDMA weight values.

Figure 4:
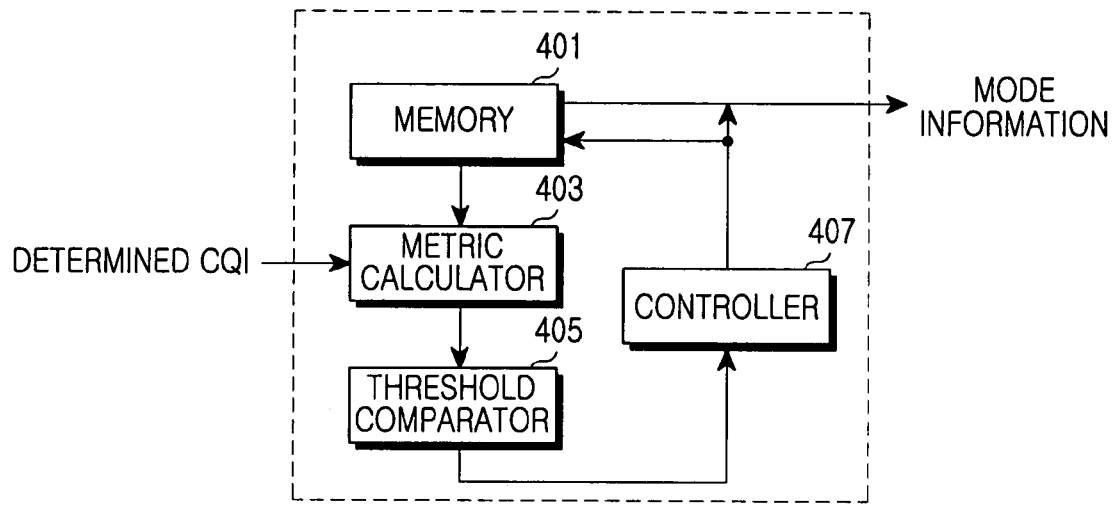
FIG. 4 is a detailed block diagram of a BF/SDMA selector according to an exemplary embodiment of the present invention.

FIG. 4 is a detailed block diagram of the BF/SDMA selector 307 according to an exemplary embodiment of the present invention.

Referring to FIG. 4, the channel information output from the channel estimator 301 is stored in a memory 401. A metric calculator 403 calculates a metric function expressed by Equation 1 using the channel information stored in the memory 401. A threshold comparator 405 receives the metric function value calculated by the metric calculator 403 and compares the received metric function value with a preset threshold. A controller 407 selects the SDMA mode if the metric function value is less than the preset threshold and selects the BF mode if the metric function value is greater than the preset threshold. Information about the selected transmission mode is output to the BF/SDMA weight calculator 309.

Figure 5:
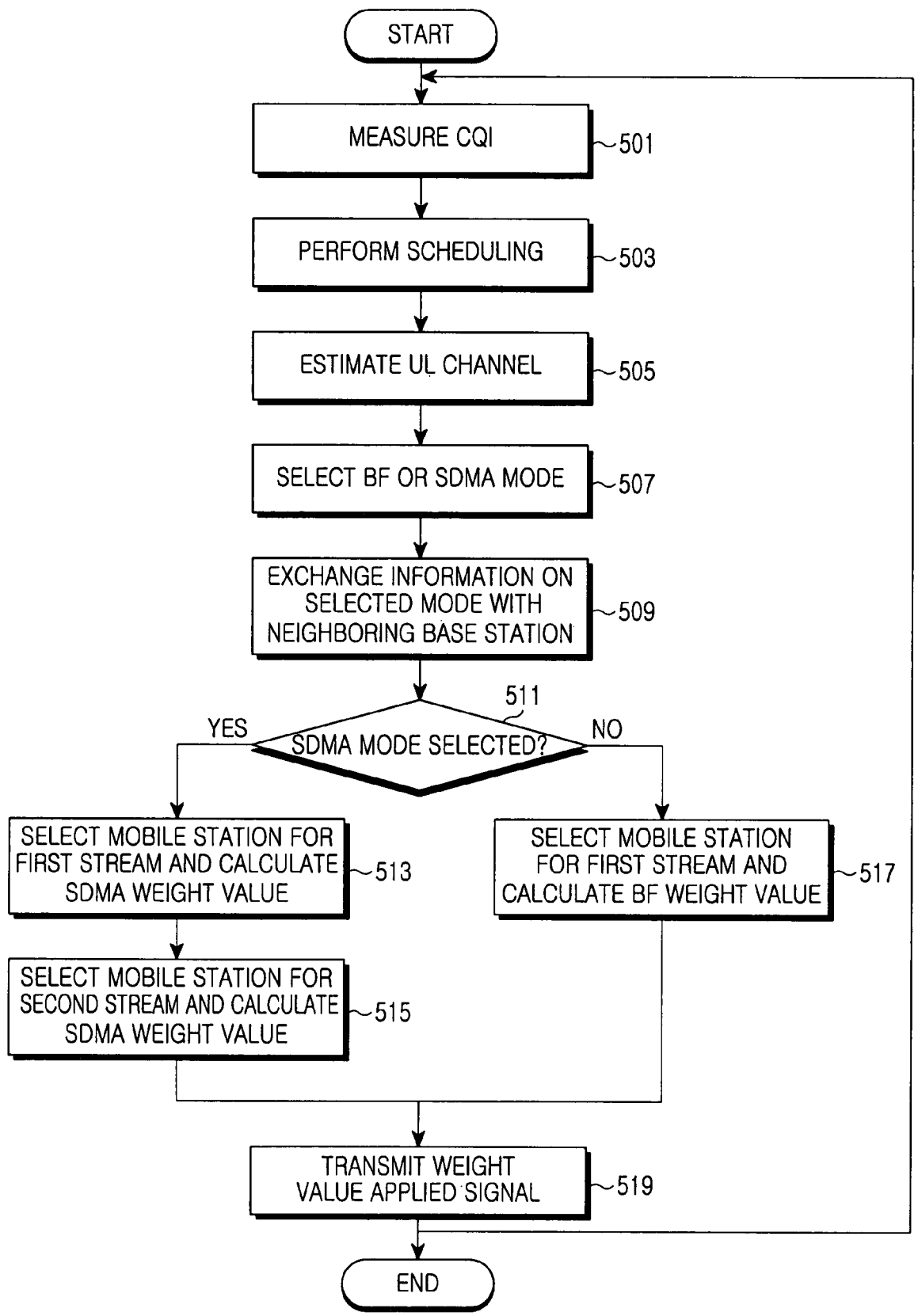
FIG. 5 is a flowchart illustrating a process of transmitting a signal based on transmission mode determination performed by a base station according to an exemplary embodiment of the present invention.

FIG. 5 is a flowchart illustrating a process of transmitting a signal based on transmission mode determination performed by a base station according to an exemplary embodiment of the present invention.

Referring to FIG. 5, the base station determines CQI based on DL channel state information transmitted from a mobile station in step 501. In step 503, the base station selects a scheduling-target mobile station based on a data transmission request from each mobile station, standby time from the reception of the data transmission request up to the current point of time, and the CQI. In step 505, the base station performs uplink (UL) channel estimation. In step 507, the base station determines a sounding sequence to be transmitted by the mobile station and determines one of the BF mode and the SDMA mode.

In step 509, the base station exchanges information about the determined transmission mode between the BF mode and the SDMA mode and the determined sounding sequence with a neighboring base station. In step 509, the base station also receives information about a determined transmission mode and a determined sounding sequence from a neighboring base station. The process goes to step 513 if the base station determines the SDMA mode and goes to step 517 if the base station determines the BF mode.

In step 513, the base station selects a first base station that is to transmit a first stream (i.e., a first signal) in the SDMA mode, and calculates an SDMA weight value to be applied to the first mobile station. In step 515, the base station selects a second base station that is to transmit a second stream (i.e., a second signal) in the SDMA mode, and calculates an SDMA weight value to be applied to the second mobile station.

In step 517, the base station selects a mobile station that is to transmit a first stream (i.e., a first signal) in the BF mode, and calculates a BF weight value to be applied to the determined mobile station.

In step 519, the base station transmits a signal after applying the determined SDMA weight values or BF weight value to the signal.

Figure 6:
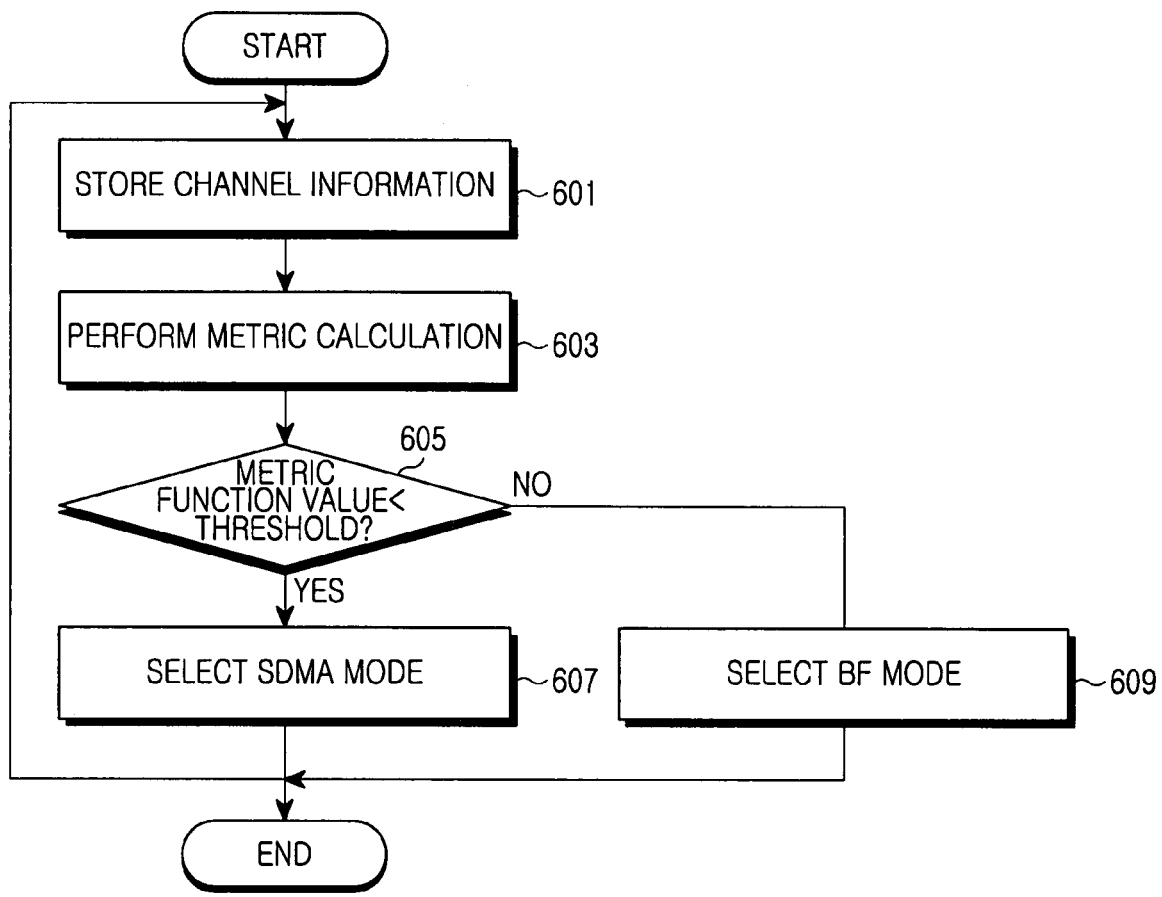
FIG. 6 is a flowchart illustrating a process in which a base station determines a transmission mode according to an exemplary embodiment of the present invention.

FIG. 6 is a flowchart illustrating a process in which a base station determines a transmission mode according to an exemplary embodiment of the present invention.

Referring to FIG. 6, the base station stores channel information determined using channel feed-back information or sounding sequence information transmitted by a mobile station in step 601. In step 603, the base station determines a metric function value using Equation 1. In step 605, the base station compares the determined metric function value with a preset threshold. The process goes to step 607 if the metric function value is less than the threshold and goes to step 609 if the metric function value is greater than the threshold value. The base station selects the SDMA mode in step 607 and selects the BF mode in step 609.

As is apparent from the foregoing description, according to the present invention, in a wireless mobile communication system having a multi-cell (or multi-sector) structure, the BF mode and the SDMA mode are selectively used for each cell (or each sector), thereby improving scheduling gain and overall system performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a transmission mode for a base station in a wireless mobile communication system, the method comprising:
   measuring a state of a channel with a mobile station;
   determining whether channel states between the mobile station and a predetermined number of other mobile stations are orthogonal to each another;
   determining a space division multiple access (SDMA) mode as the transmission mode for the base station if the channel states are orthogonal to each other; and
   determining a beamforming (BF) mode as the transmission mode for the base station if the channel states are not orthogonal to each other.

2. The method of claim 1, wherein the determination of whether the channel states are orthogonal to each other comprises:
   comparing a metric function value determined using the equation:

$$f(h_a, h_b) = \frac{|h_b^H \cdot h_a|}{\sqrt{h_a^H \cdot h_a} \sqrt{h_b^H \cdot h_b}},$$

with a preset threshold, wherein a and b indicate a mobile station a and a mobile station b, h indicates a channel vector, and a superscript H indicates Hermitian; and
   determining that the channel states are orthogonal to each other if the metric function value is less than the threshold.

3. The method of claim 1, further comprising exchanging information about the determined transmission mode with a neighboring base station.

4. The method of claim 1, wherein the state of the channel is measured using channel quality information or a sounding sequence fed back by the mobile station.

5. An apparatus for determining a transmission mode for a base station in a wireless mobile communication system, the apparatus comprising:
   a metric calculator for receiving channel state information of a preset number of mobile stations and performing metric calculation to determine whether channel states of the mobile stations are orthogonal to each other;
   a threshold comparator for receiving a metric function value from the metric calculator and comparing the metric function value with a preset threshold; and
   a controller for selecting a space division multiple access (SDMA) mode if the metric function value is less than the threshold and selecting a beamforming (BF) mode if the metric function value is greater than the threshold.

6. The apparatus of claim 5, wherein the metric calculator performs metric calculation using:

$$f(h_a, h_b) = \frac{|h_b^H \cdot h_a|}{\sqrt{h_a^H \cdot h_a} \sqrt{h_b^H \cdot h_b}},$$

where a and b indicate a mobile station a and a mobile station b, h indicates a channel vector, and a superscript H indicates Hermitian.

7. For use in a wireless network, a base station capable of communicating with a plurality of mobile stations, the base station comprising an apparatus for determining a transmission mode for the base station, the apparatus comprising:
   a metric calculator for receiving channel state information of a preset number of the plurality of mobile stations and performing metric calculation to determine whether channel states of the mobile stations are orthogonal to each other;
   a threshold comparator for receiving a metric function value from the metric calculator and comparing the metric function value with a preset threshold; and
   a controller for selecting a space division multiple access (SDMA) mode if the metric function value is less than the threshold and selecting a beamforming (BF) mode if the metric function value is greater than the threshold.

8. The base station of claim 7, wherein the metric calculator performs metric calculation using:

$$f(h_a, h_b) = \frac{|h_b^H \cdot h_a|}{\sqrt{h_a^H \cdot h_a} \sqrt{h_b^H \cdot h_b}},$$

where a and b indicate a mobile station a and a mobile station b, h indicates a channel vector, and a superscript H indicates Hermitian.

9. The base station of claim 8, wherein the base station exchanges information about the selected transmission mode with a neighboring base station.

10. The base station of claim 9, wherein the state of the channel is measured using channel quality information or a sounding sequence fed back by a mobile station.

11. A wireless network comprising a plurality of base stations capable of communicating with mobile stations, each base station comprising an apparatus for determining a transmission mode for the each base station, the apparatus comprising:
  a metric calculator for receiving channel state information of a preset number of the mobile stations and performing metric calculation to determine whether channel states of the mobile stations are orthogonal to each other;
  a threshold comparator for receiving a metric function value from the metric calculator and comparing the metric function value with a preset threshold; and
  a controller for selecting a space division multiple access (SDMA) mode if the metric function value is less than the threshold and selecting a beamforming (BF) mode if the metric function value is greater than the threshold.

12. The wireless network of claim 11, wherein the metric calculator performs metric calculation using:

$$f(h_a, h_b) = \frac{|h_b^H \cdot h_a|}{\sqrt{h_a^H \cdot h_a} \sqrt{h_b^H \cdot h_b}},$$

where a and b indicate a mobile station a and a mobile station b, h indicates a channel vector, and a superscript H indicates Hermitian.

13. The wireless network of claim 12, wherein each base station exchanges information about the selected transmission mode with a neighboring base station.

14. The wireless network of claim 13, wherein the state of the channel is measured using channel quality information or a sounding sequence fed back a the mobile station.

* * * * *